April 7, 1931. W. H. STANSBERRY 1,799,445

FROST SHIELD

Filed Jan. 14, 1929

Inventor
Warren H. Stansberry
By Liverance
and
Van Antwerp
Attorneys

Patented Apr. 7, 1931

1,799,445

UNITED STATES PATENT OFFICE

WARREN H. STANSBERRY, OF GRAND HAVEN, MICHIGAN, ASSIGNOR TO PEERLESS NOVELTY COMPANY, OF GRAND HAVEN, MICHIGAN, A CORPORATION OF MICHIGAN

FROST SHIELD

Application filed January 14, 1929. Serial No. 332,348.

This invention relates to a frost shield which is adapted to be securely attached to the inner side of a windshield glass or the inner sides of other glass in motor vehicle bodies, whereby the inner sides of the glass covered by said shield does not accumulate moisture from the breath of persons riding in the automobile, thus eliminating fogging the glass or the collection of frost or ice thereon. Devices of this character are very desirable for use with closed body automobiles in the winter time in those sections of the country where the temperature gets below freezing.

Figure 1:
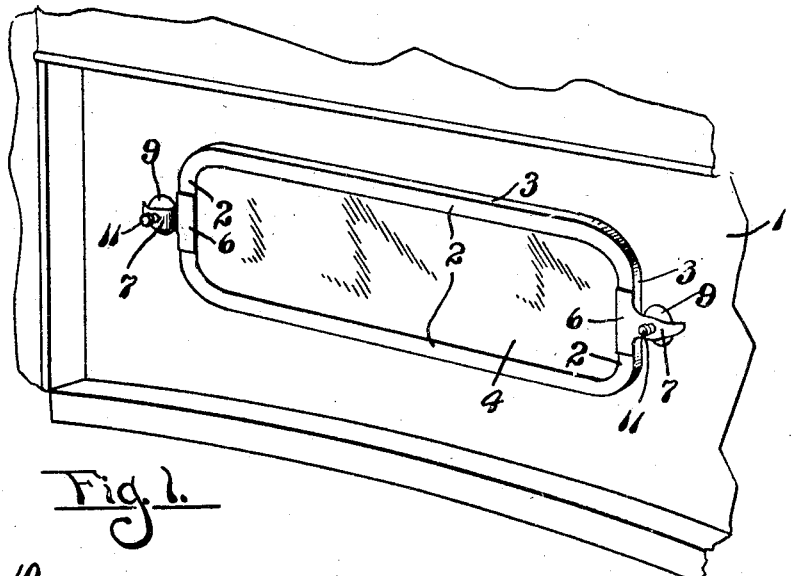

It is an object and purpose of the present invention to provide a very simply constructed yet extremely practical frost shield, one which can be manufactured and sold at low cost and which is very quickly and easily applied to the inner sides of glass in a motor vehicle. The specific construction of the frost shield is fully described in the following description taken in connection with the accompanying drawing, in which, Fig. 1 is a perspective view showing the frost shield of my invention applied at the inner side of a glass in a motor vehicle.

Figure 2:
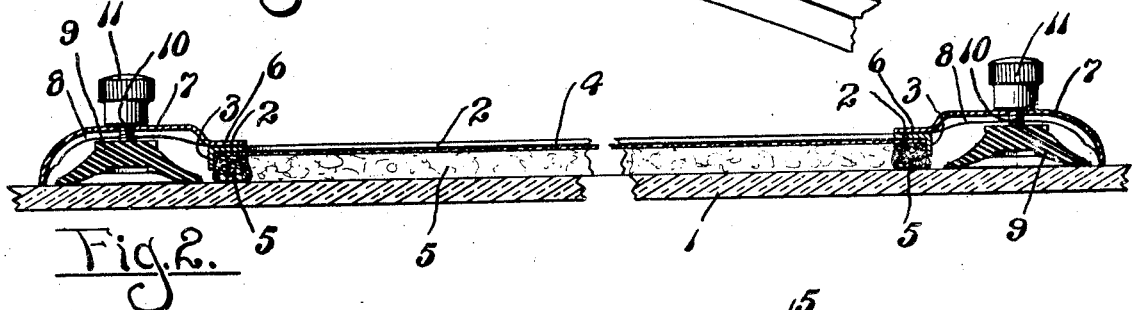
Figure 3:
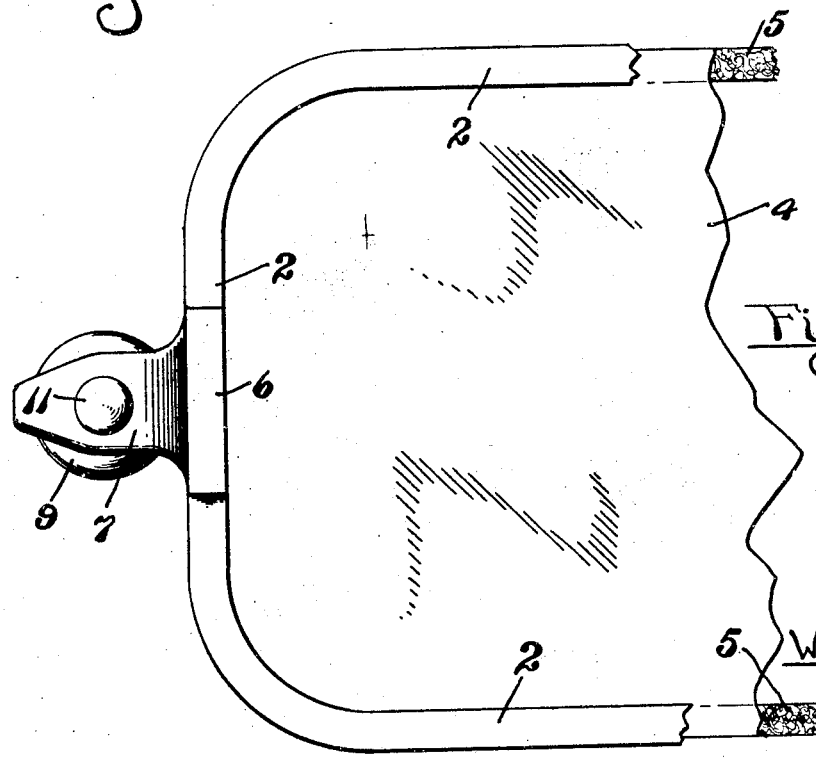

Fig. 2 is a somewhat enlarged horizontal section through the shield and glass to which it is applied, and Fig. 3 is a fragmentary elevation of the frost shield one end thereof being shown.

Like reference characters refer to like parts in the different figures of the drawing.

The glass 1 to which the shield is applicable may be the front windshield glass or any other glass substantially vertically positioned in an automobile body. The frost shield is applied to said glass at its inner side or within the body of the automobile.

The frost shield comprises an outer frame having upper and lower parallel sides preferably connected by vertical ends, the corners being rounded as shown. The frame is made from metal and is of angle form in cross section, providing vertical flanges 2 which extend toward each other from the sides and ends of the frame and horizontal flanges 3 which, when the shield is applied to the glass, extend toward the glass. A sheet 4 of transparent material, preferably celluloid, is cut to a size to fit within the frame and lie against the inner sides of the flanges 2. A cushion member 5 of felt or similar fabric material having a form similar to the form of the frame described is located within the flanges 3 and bears against the transparent member 4 adjacent its edges or where it comes against the flanges 2 of the metal frame.

At each end of the outer frame of the frost shield a metal member is permanently secured by welding, brazing or equivalent means comprising a part 6 which lies flat against the flange 2 of each end of the frame and an outwardly extending curved finger 7 which at its side edges has inturned reinforcing flanges 8. Underneath each of the fingers 7 between the outer end thereof and the adjacent end of the frame a rubber suction cup 9 is located heaving a threaded pin 10 extending therefrom through the adjacent finger between its ends for the reception of a nut 11 after the pin has passed through said finger.

In applying the frost shield to glass, such as the windshield, door glass or rear window of an automobile, the suction cups at their edges are treated, preferably with a suitable liquid such as shellac or the like and the shield is pressed against the glass, the ends of the fingers 7 first coming into contact therewith. Then by screwing the nuts onto the threaded pins 10 the free side of the fabric member 5 is brought against the glass and may be pressed thereagainst with considerable pressure dependent upon the extent to which the nuts 11 are threaded onto the pins 10, it being apparent that the free ends of the fingers 7 act as fulcrum points about which the fingers turn inwardly toward the glass to bring the shield into close and intimate contact therewith, compressing the felt and forming an enclosure between the glass and the transparent member 4 which is air tight and into which no moisture laden air can pass.

The air pocketed between the glass and the transparent member 4 not being capable of receiving moisture from the breath of those in the automobile, there is no fog deposited on the glass 1 in the area surrounded by the frame 2 and the attached fabric member 5 and a clear vision may be had through the transparent member 4 and the glass directly opposite it. This construction of frost shield as before stated, is very practical, is easily applied to the inner sides of glass in an automobile, remains secure in any position to which it is attached and is economical to manufacture.

It has proved very successful in service. The invention is defined in the appended claims and is to be considered comprehensive of all forms of structure coming within their scope.

I claim:

1. A device of the class described comprising, an open frame of metal, a transparent member located against one side of the frame and closing the opening therein, a fabric member having the same outline as said frame located against said transparent member and adapted to be disposed between the frame and glass to which the device is to be secured, metal fingers extend outwardly from each end of the frame having free end portions adapted to bear against the glass, a suction cup on each of said fingers located between the frame and the end of the finger, threaded pins extending from the cups through said fingers between the ends thereof, and nuts screwed onto said pins at the opposite sides of the fingers.

2. A device of the class described comprising, an open metal frame having sides and ends of angle iron form including two flanges located at right angles to each other, a transparent member located against one of the flanges of said sides and ends and within the other of the flanges, a fabric member having the same outline as the frame bearing against said transparent member and located partly within the last mentioned flanges but extending beyond the same, and means connected to said frame and adapted to be operated to secure the frame to glass at one side thereof and press said fabric member securely against the glass at all points in the length of the fabric member.

3. A device of the class described comprising, an open frame of metal having sides and ends of angle iron form with flanges extending inwardly toward each other into an opening of the frame and other flanges located at right angles to the first flanges, a transparent member disposed within the said second named flanges and bearing against one side of the first flanges, a fabric member having an outline like said frame bearing against the transparent member adjacent its side and end members and located partly within the second named flanges and extending partly beyond the same, metal fingers extending outwardly, one from each end of the frame, each of said fingers being curved at its free end portion in a direction whereby the ends of said fingers are located substantially in the same plane of the free side of said fabric member, a suction cup of rubber or like material located between each end of the frame and the curved end of the finger attached thereto, a threaded pin attached to each suction cup and extending through the adjacent finger between the ends thereof and a nut threaded onto each of said pins to bear against said adjacent finger.

4. A device of the class described comprising, an open frame, a transparent closure at one side of said frame, fingers extending outwardly from the frame, each of said fingers having its outer end terminating in a plane substantially flush with the other side of said frame and a suction cup mounted on each of said fingers between its end and the respective portion of the frame.

5. In combination with a surface, a frame adjacent said surface, fingers extending outwardly from the frame, the outer ends of the fingers engaging against the said surface and fastening means attached to the surface and engaging with each finger at a point between the frame and its outer end.

In testimony whereof I affix my signature.

WARREN H. STANSBERRY.